(12) United States Patent
Queenan et al.

(10) Patent No.: US 12,182,241 B1
(45) Date of Patent: Dec. 31, 2024

(54) DUAL CAMERA AUTHENTICATION

(71) Applicant: Idemia Identity & Security USA LLC, Billerica, MA (US)

(72) Inventors: James R. Queenan, Meredith, NH (US); David Adam Versprille, Nashua, NH (US); Matthew Gordon Cole, Bedford, MA (US)

(73) Assignee: IDEMIA IDENTITY & SECURITY USA LLC, Reston, VA (US)

( * ) Notice: Subject to any disclaimer, the term of this patent is extended or adjusted under 35 U.S.C. 154(b) by 396 days.

(21) Appl. No.: 17/673,181

(22) Filed: Feb. 16, 2022

(51) Int. Cl.
G06F 21/32 (2013.01)
G06V 40/16 (2022.01)
H04N 9/69 (2023.01)
H04N 23/88 (2023.01)

(52) U.S. Cl.
CPC ............ G06F 21/32 (2013.01); G06V 40/172 (2022.01); H04N 9/69 (2013.01); H04N 23/88 (2023.01)

(58) Field of Classification Search
CPC ....... G06F 21/31; G06F 21/32; G06V 40/172; G06V 40/173; H04N 23/88; H04N 9/69
See application file for complete search history.

(56) References Cited

U.S. PATENT DOCUMENTS

| | | | | |
|---|---|---|---|---|
| 11,348,480 B2 * | 5/2022 | Dialameh | ............. | G06F 16/955 |
| 11,490,038 B2 * | 11/2022 | Okuike | ................. | G03B 7/091 |
| 11,689,803 B2 * | 6/2023 | Cohen | ................. | H04N 7/0127 |
| | | | | 348/240.99 |
| 11,704,398 B1 * | 7/2023 | Tougas | ................... | G06F 21/36 |
| | | | | 726/9 |
| 11,729,342 B2 * | 8/2023 | Fayad | ................... | H04N 7/147 |
| | | | | 348/36 |
| 11,886,562 B2 * | 1/2024 | Rojas | ................... | G06V 40/168 |

\* cited by examiner

Primary Examiner — Hosuk Song
(74) Attorney, Agent, or Firm — Armstrong Teasdale LLP

(57) ABSTRACT

Methods, systems, and computer-readable storage media for verification of identity of individuals based on images obtained by two cameras. A first stream of images of an individual are obtained from a first camera. Gamma correction is applied to images of the first stream of images. A second stream of images of the individual is obtained simultaneously with the first stream of images from a second camera, where gamma correction is not applied to images of the second stream of images. An identity of the individual is verified by providing the first stream of images and the second stream of images for independent automated matching with an authentication image. The authentication image is an image of the individual from a verified source.

20 Claims, 6 Drawing Sheets
(2 of 6 Drawing Sheet(s) Filed in Color)

DUAL CAMERA AUTHENTICATION

TECHNICAL FIELD

This disclosure generally related to identity verification and image capture.

BACKGROUND

Digital cameras are capable of capturing images of an individual performing an identity verification based on a verified source. Identity verification can be performed to match biometric features such as face features of an authenticating individual with features depicted in a verified source, such as an identity card. Images of the users obtained by digital cameras can suffer from certain flaws such as blurriness, color imbalance, mid-tones, shadows, highlights, and grayness of blacks, among other examples. Such flaws in images may influence the image processing during identity verification. Present facial identification systems tend to produce non-uniform results for darker images, and with darker skin tones because they apply a uniform scale for automatic image brightness/contrast correction. Improvements in accuracy for such systems are desirable.

SUMMARY

Implementations of the present disclosure are directed to verification of identity of individuals based on images obtained by two cameras. Two streams of images can be obtained simultaneously (or substantially simultaneously) from two cameras, where the two cameras are configured differently to perform corrections over the correspondingly obtained images. One of the cameras applies gamma correction and the other camera does not have gamma correction applied.

One example method may include operations such as: obtaining, from a first camera, a first stream of images of an individual, wherein gamma correction is applied to images of the first stream of images; obtaining, from a second camera, a second stream of images of the individual simultaneously with the first stream of images, wherein gamma correction is not applied to images of the second stream of images; and verifying an identity of the individual by providing the first stream of images and the second stream of images for independent automated matching with an authentication image, wherein the authentication image is an image of the individual from a verified source.

In some instances, the gamma corrections can be applied to adjust image conditions for darker images. In some instances, the example method may further include that after the gamma correction is applied, the images of the first stream of images are processed by adjusting characteristics of the images of the first stream to enhance one or more of color, brightness, and saturation of the images of the first stream of images. In some of those instances, the images of the second stream of images can be processed by adjusting characteristics of the images of the second stream of images to enhance one or more of color, brightness, and saturation of the images of the second stream.

In some instances, adjusting the characteristics of the images of either the first stream or the second stream includes performing automatic white balance corrections on captured images of the individual.

In some instances, obtaining images by the first camera and/or the second camera includes automatically adjusting a dynamic range of captured images to a wider gray level range.

In some instances, obtaining images by the first camera and the second camera is performed by automatically determining a correct exposure of the individual that is captured at the images.

In some instances, the first stream of images and the second stream of images are obtained during a predetermined period of time.

In some instances, the example method can include verifying an identity of the individual by providing the first stream of images and the second stream of images for independent automated matching with an authentication image. The providing of the images from the first and the second stream can include providing a first subset of images from the first stream and a second subset of images from the second stream for independent automated matching. Images of the first subset of images and of the second subset of images can meet a quality criteria for use of the images in identity authentication of the individual based on facial recognition.

In some instances, the example method can include ranking the images of the first stream and the second stream according to the quality criteria, and wherein the quality criteria include rules associated with color quality characteristics of the images and facial features requirements.

In some instances, the gamma correction is performed on an input signal received from the first camera when capturing images of a face of the individual to adjust at least one captured image of the face by brightening regions of the image that are darker to reproduce fine differences in shade within the image to differentiate between reproduced features of the face of the individual.

In some instances, the obtaining of the first stream of images include: applying the gamma correction when capturing images of the individual at the first camera; and subsequently applying automatic enhancements of characteristics of the captured images to obtain the first stream of images, wherein the automatic enhancements include automated white balancing corrections, automated gain, and automated exposure.

In some instances, the example method includes: scanning an identity document as the verified source of the authentication image of the individual; in response to processing the identity document, extracting the authentication image of the individual from the identity document; and providing the authentication image of the individual for independent biometric matching of the authentication image with images from the first stream and second stream of images.

In some instances, the example method includes: determining a successful matching image from at least one of the first stream and the second stream of images to the authentication image of the individual, wherein the successful matching image is determined based on a threshold biometric matching criteria for authenticating the individual.

In some instances, the verification of the identity of the individual is based on face features matching between face features extracted from at least a portion of the images of the first stream of images and/or at least a portion of the images of the second stream of images and face features extracted from the authentication image.

In some instances, the first camera and the second camera are part of a mobile device, and wherein the first stream of images and the second stream of images are used for performing face recognition of the individual to provide access to requested resources at the mobile device.

Other implementations of this aspect include corresponding systems, apparatus, and computer programs, configured to perform the actions of the methods, encoded on computer storage devices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

These and other implementations can each provide one or more advantages. Implementations improve the accuracy and uniformity of facial recognition systems. For example, by performing gamma correction on one stream of images more uniform facial identification results can be obtained across a wider spectrum of image brightness and user skin tones.

The details of one or more implementations of the present disclosure are set forth in the accompanying drawings and the description below. Other features and advantages of the present disclosure will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

Figure 1A:
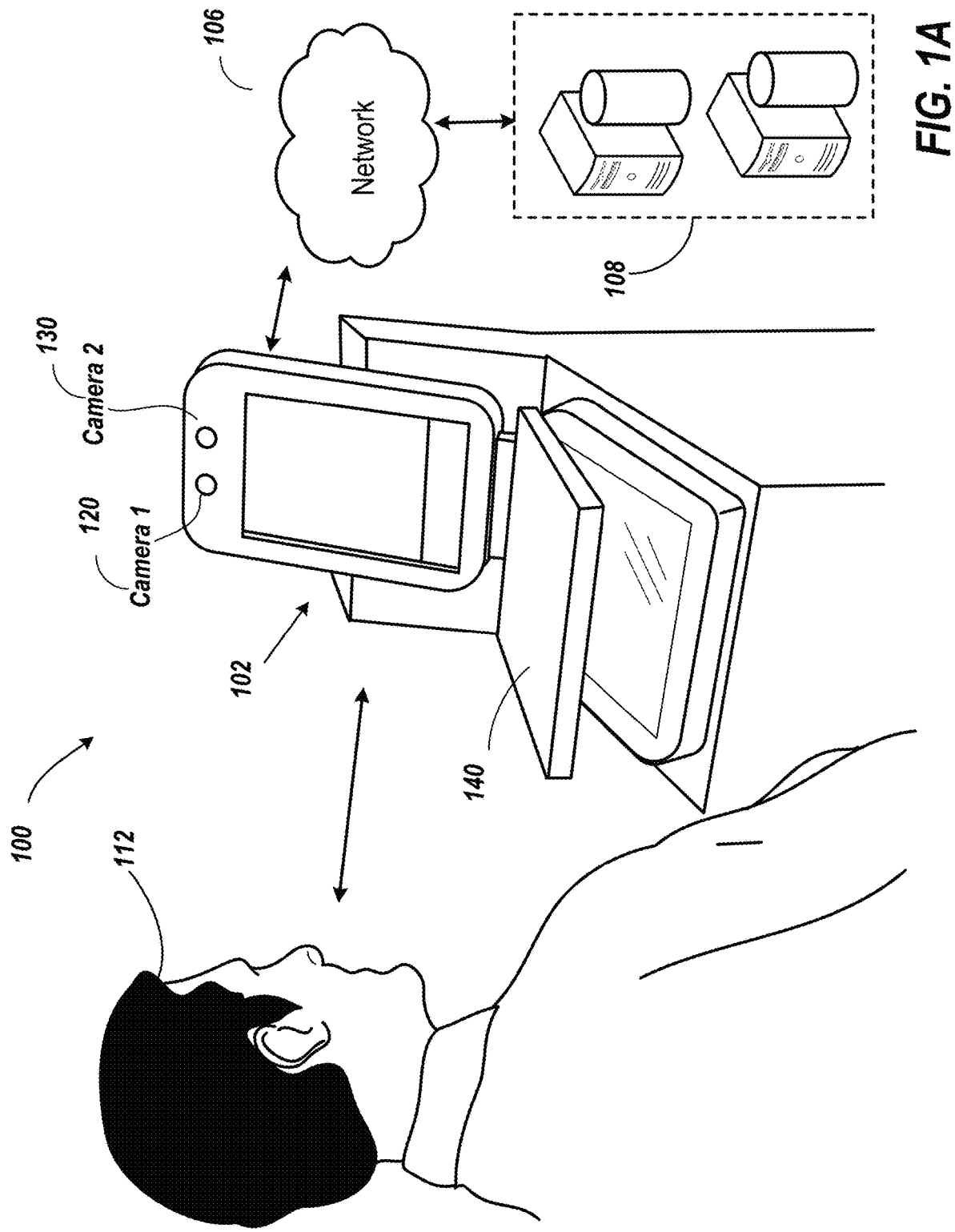
FIG. 1A depicts an example system that can be used to execute implementations of the present disclosure.

Implementations of the present disclosure are directed to are directed to verification of identity of individuals based on images obtained by two cameras.

In some instances, individuals can use digital devices or systems to perform identity verification. Identity verification can be performed in different context and different scenarios where an individual is providing an identification document or other biometric data to be used for verifying the identity of the individual. Identity verification can be performed by executing biometric or third-party checks over the captured identity of the person presenting the identification document or biometric data. For example, people can perform such identity verification when travelling and getting their identity checked at the airport. In another example, individuals perform identity verification when accessing buildings, indoor or outdoor spaces, events, and/or perform certain operations and transactions that require identity verification, among other example use cases where there are verification identity checks imposed on entry. In some examples, online transactions executed through software applications or services may support execution of identity verification.

In some instances, face images of an individual are captured to perform face matching between live captured images of the face of the individual with an authentication image from a verified source (e.g., passport, identity card, driving license, or other verifiable source). In some instances, images of an individual can be taken and those live images can be compared or matched with an image provided by the verified source to determine whether the verified individual corresponds to the individual associated with the verified source. In some instances, the verified source can include or refer to a verified photograph of an individual.

In some instances, when performing identity verification images of the face of the individual can be captured over a predetermined time. The images can be considered as face events that capture the face in positions that are usable for the identity verification. For example, the face can be imaged when the eyes of the individual are looking at a certain angle compared to the camera, when ears are visible, when location of the face towards the camera is within predefined limits, others. In some instances, the captured facial images can be provided for use during the identity verification for comparison with an authentication image from the verified source.

In some instances, image quality such as brightness and color characteristics can affect image processing in the context of biometric authentication. In some cases, images can look bleached out, or too dark, which can be a result of inaccurate reproduction of the colors. Poor color representations in a captured image can lead to poor performance of image processing and matching of the image with a printed photograph from the verified source provided by the individual.

In some instances, image matching can be performed by iteratively comparing images obtained by a camera with an authentication image until a best match is determined. The best match can be determined according to a predefined best match criteria that can relate to a determination that the two images (the best match and the authentication image) share an amount of common facial characteristics that can be above a certain threshold value to determine that the individual's identity can be verified.

In some instances, color characteristics of the captured image of the face of an individual can affect the quality of the captured image. The nature and the color of the scene that is captured can influence the quality of the result image. For example, darker images can be more prone to reproducing with poor color characteristics. For example, light conditions, skin tone of the face of the individual, hair color of the individual, eye colors, shadows, among other examples, can affect the color qualities of a captured image. For example, captured images of darker scenes such as scenes including a face of an individual that is with darker skin tone can experience poor color representation. In those examples, corrections the captured images can be applied to improve the representation. Images that are influences by the nature of the pictured image can be associated with poor performance during face matching processes when matched with an authentication image of the individual.

In some instances, color of captured images such as skin color of a face of an imaged individual can influence the quality of the captured image and that can subsequently negatively influence image processing and identity verification based on such captured image. For example, images which quality is affected by the skin color of the imaged individual can result in extended time processing and computationally intensive matching to determine an image from the images that match another authentication image. Further, image matching based on images that can be affected by the skin color of the imaged individual can result in a lower successful matching rate. In those cases, the probability of achieving false negative results during identity verification of the imaged individual can be higher since the matching can be affected by the quality of the image.

In some instances, gamma correction can be applied when capturing images of the individual to improve the image processing for the captured image of darker imaged scenes including darker skin individuals. In some instances, gamma correction can be applied to images captured by a camera to reduce influence of illumination and/or underlying color or tones of the captured image on a result image that is to be used for face detection and recognition.

In some instances, further color corrections can be additionally applied to uniformly improve the color characteristics of the images. For example, automatic white balancing corrections can be applied by the cameras when capturing the images to adjust the characteristics of the images. Further, a dynamic range of the captured images can be adjusted to a wider gray level range to maintain a suitable amplitude at the output images.

For example, if an individual has a darker skin tone, identity verification of the individual based on captured images where gamma correction is applied can be performed faster, more accurately, and with reduced computing resource expenditure. In some instances, the gamma correction can consider the nature of the image and be directed to improve quality of images that are degraded due to darker skin tones of the individual whose face is imaged. In those instances, if a series of live images are obtained for the individual having the darker skin tone and the gamma correction is applied when obtaining the images of the face of the individual, fewer of those images may need to undergo biometric matching before a successful match between one of the images is determined to match an authentication image of the individual. This can result in shorter time for determining the result of the identity verification, determine results with better accuracy, and fewer resources expenditure to perform multiple matching operations.

FIG. 1A depicts an example architecture 100 in accordance with implementations of the present disclosure. In the depicted example, the example architecture 100 includes a device or system 102, a network 106, and a server system 108. The server system 108 includes one or more server devices and databases (e.g., processors, memory). In the depicted example, a user 112 interacts with the device 102.

In some examples, the device 102 can communicate with the server system 104 over the network 106. In some examples, the device 102 includes any appropriate type of computing device such as a desktop computer, a laptop computer, a handheld computer, a tablet computer, a personal digital assistant (PDA), a cellular telephone, a network appliance, a smart device, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1A, the server system 104 is intended to represent various forms of servers including, but not limited to a web server, an application server, a proxy server, a network server, and/or a server pool. In general, server systems accept requests for application services and provides such services to any number of devices (e.g., the device 102 over the network 106).

In some implementations, the device 102 can be part of a biometric authentication system. In some implementations, the user 112 can request to perform an operation and/or a transaction that required identity verification. The device 102 can include a scanner 140 to scan an identity document provided by the user 112 when performing identity verification. The device 102 can include a user display to provide instructions for the user with regard to the executed operation and/or the identity verification. The device 102 can include a speaker to provide voice instructions to the user 112.

In some implementations, the device 102 includes two cameras—camera 120 and camera 130—that are configured to capture images of the user 112 for a predetermined time period. The captured images of the individual by the two cameras can form two separate streams of images. In some instances, the first camera 120 can be a camera that applies gamma corrections to encode images by optimizing the usage of bits to generate images that are closer to the human's perception of light and color. For example, brightness or lightness characteristics of images captured under common illumination conditions follow a power function that demonstrates greater sensitivity to relative differences between darker tones than between lighter tones. Therefore, images of lower resolution can have lower contrast of different features presented as part of darker regions of the image. In some instances, an image that has lower resolution may be associated with difficulties when executing image comparison with another image since features in regions having darker tokens may be not apparent to the computer image matcher. If the resolution is expanded through application of gamma correction, the features in regions that are of darker tokens can be more detectable compared to not gamma-corrected images, and thus may support improved performance in accurately matching of images. If images are not gamma-encoded, they can allocate too many bits to highlights that humans cannot differentiate and too few bits to shadow values that humans are sensitive to and would require more bits to maintain the same visual quality. By applying gamma corrections, the intended intensity of the primary colors (red, green, and blue) of the images can be non-linearly encoded.

In some instances, the images obtained by the first camera 120 can be also automatically corrected, after the gamma correction, to uniformly improve the colors. For example, execution of automated white balancing, auto gain, and auto exposure can be configured at the first camera 120 to correct the images of the first camera 120 after applying the gamma correction. The images obtained by the second camera 130 can be images that are obtained without applying gamma corrections. The images obtained by the second camera 130 can be images that have uniformly improved colors without applying gamma correction. Thus, those images can have improved brightness and color balance, however, those characteristics can be applied uniformly to the whole image and would not additionally improve the display of darker portions of the image, for example, in cases when the individual has darker skin tones.

Figure 1C:
FIG. 1C depicts an example image captured by a camera without gamma correction settings applied.
Figure 1B:
FIG. 1B depicts an example image captured by a camera with gamma correction settings applied.

In some instances, an image obtained by the first camera 120 can be the image 130 of FIG. 1B (with gamma correction applied), and an image obtained by the second camera 140 can be the image of FIG. 1C (with no gamma correction). In some instances, based on the skin tone of the individual that is captured and/or other image characteristics (e.g., light source), images from one of the cameras may represent the individual (e.g., face) in a way that is easier to identify individual facial features and to detect subtle characteristics of an individual's facial features.

In some instances, the two streams of images can be provided for performing identity verification of the individual by independent automated matching between images of the two streams and an authentication image of the individual that can be determined based on a provided verified source. In some instances, images from either of the streams can be taken iteratively and matched with the authentication image, where such iterative process can be performed until a best match image is determined. In some instances, a best match image can be an image that is captured by the first camera 120, or from the second camera 130.

In some instances, when an individual who has darker skin is performing identity authentication as implemented at 100, the two cameras 120 and 130 can collect images, where the images from the first camera 120 that are with applied gamma correction can better represent the features of the individual since the gamma correction is applied on an input signal received from the first camera when capturing images of a face of the individual. The gamma correction can adjust the captured image of the face by brightening regions of the image that are darker to reproduce fine differences in shade within the image to differentiate between reproduced features of the face of the individual. These adjustments to darker images improve the accuracy and efficiency by which image matching algorithms can perform facial identity verification. For example, image matching algorithms can detect and match fine differences in images more accurately and efficiently when subject images gamma correction is applied to brighten and improve the contrast in regions with fine differences in shading, In some instances, using two camera with different configurations to apply different corrections on the colors can improve the image processing to determine a best match image from either of the cameras when matching with an authentication images of the individual. In some instances, based on the skin tones of the individual performing the identity verification, a different camera may have higher chances of meeting the matching criteria before the other camera. For example, some dark skin tone individuals can be successfully verified faster and with less computational processing for the matching to determine an image from the stream of images from the first camera that applies gamma corrections. The use of two cameras for performing the identity verification can leverage the process to make it more flexible to the skin tone of the images individual.

In some instances, the user can provide as a verified source his/her passport that can be scanned by the scanner 140 to extract a photograph from the verified source. That photograph can be used for matching the images from either of the two streams. The matching can be performed iteratively with images from either of the two streams until an image from either one of the two stream is determined to match the authentication image. In some instances, an image is determined to match the authentication image when the image meets threshold biometric criteria for face matching. The biometric authentication system may implement logic for performing the biometric matching of images (e.g., facial images). In some instances, once a matching image is determined from either of the two streams, the image matching can be terminated and a successful identity verification can be determined. In some other cases, the matching of images from either of the two stream may proceed until all captured images are matched and no successful match is determined, thus to provide an unsuccessful verification result.

In some implementations, in response to determining that the identity of the user (individual) 112 cannot be verified, the identity verification process can be triggered for subsequent execution, or an alternative identity verification process can be provided.

FIG. 1B depicts an example image 130 captured by a camera with gamma correction settings applied, and FIG. 1C depicts an example image 140 captured by a camera without gamma correction settings applied. The image 130 can be obtained by a camera similar to camera 130 of FIG. 1A, and the image 140 can be obtained by a camera similar to camera 140 of FIG. 1A. The two images can be obtained by different cameras that either apply or do not apply gamma corrections while obtaining streams of images of an individual for identification of a user based on image matching of an obtained image from either one of the two streams of images (e.g., either image 130 or 140) obtained from the two cameras. The image 130 of FIG. 1B is obtained by applying corrections including gamma corrections. The image 140 of FIG. 1C is obtained by applying correction that does not include gamma corrections. For example, the image 130 represents features of the face of an individual brighter and easier to distinguish and to compare when performing image matching to detect fine differences between the image 140 and another image of a verified source (e.g., passport image). In some instances, an image that has applied gamma corrections may provide a better matching image when compared with an image that is obtained without applying gamma corrections when performing identity verification. During identity verifications, images coming from the two cameras can be compared with an image from a verified source (e.g., passport) of the individual. As such, images that better represent features of the face of the individual may be easier and faster to match to the image of the verified source to determine identity of the individual. In some instances, images, such as image 130 of FIG. 1B, may better represent features of the face of the individual. For example, for people with darker skin tones, images with gamma corrections may be faster and easier to compare to an image from a verified source since they present face features that are easier to distinguish and compare. In some other cases, images of the individual that is with lighter skin tone and that are obtained from a camera that does not apply gamma corrections may provide better images for performing identity verification.

Figure 2:
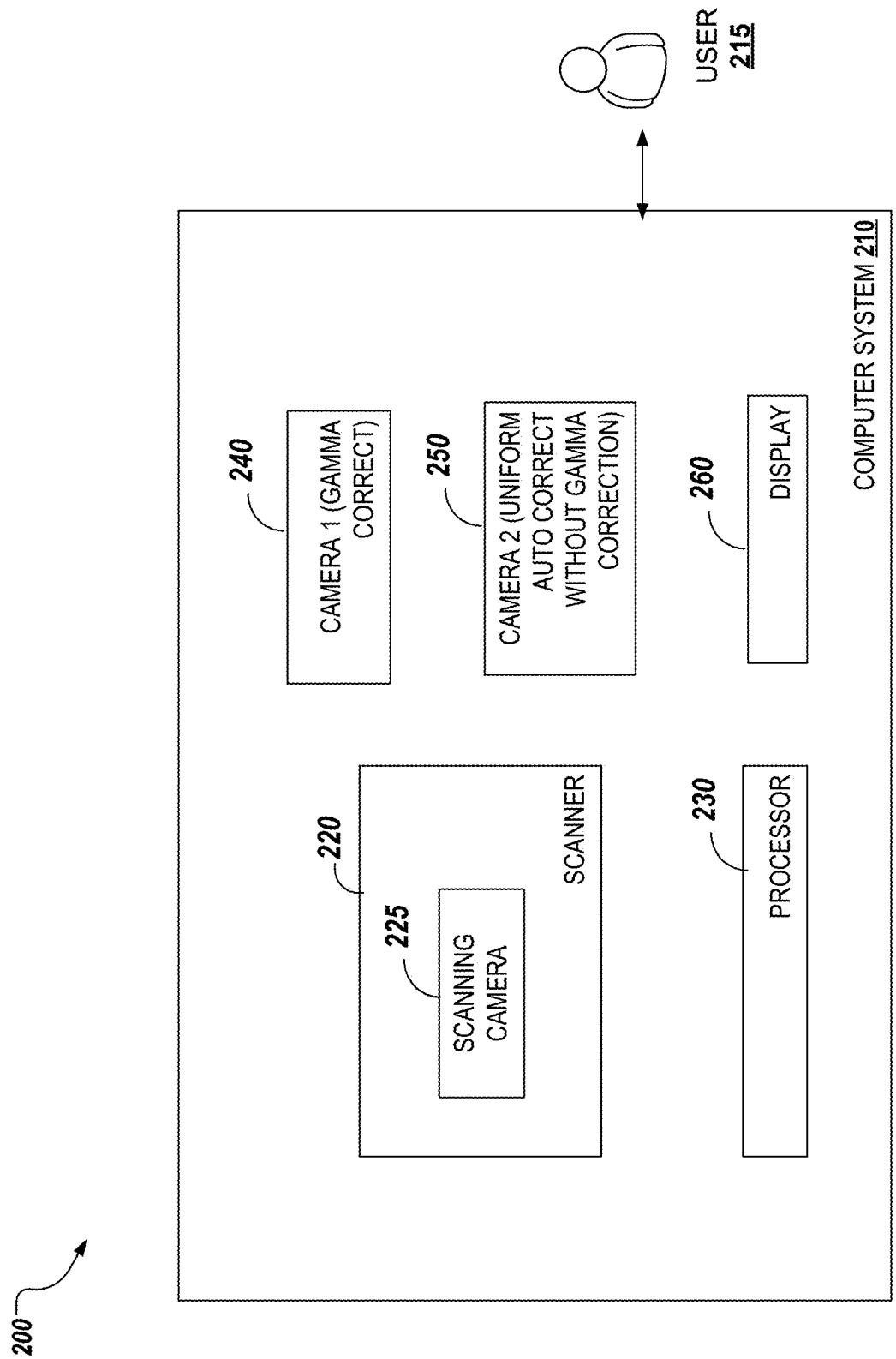
FIG. 2 is a block diagram of an example system for performing identity verification based on image capturing through two cameras in accordance with implementations of the present disclosure.

FIG. 2 is a block diagram of an environment 200 for performing identity authentication based on image capturing through two cameras in accordance with implementations of the present disclosure. In some instances, a computer system 210 can implement logic of a biometric authentication system to perform identity verification based on live imaging an individual and facial matching with an authentication image from a provided verified source. In some instances, the computer system 210 can be similar to the device 102 of FIG. 1A. The computer system includes two cameras that can be substantially similar to the two cameras presented at FIG. 1A, and one of the cameras can obtain images with applying gamma corrections similar to image 130 of FIG. 1B and the other camera can obtain images without applying gamma corrections similar to image 140 of FIG. 1C.

The first camera 240 can be configured to apply gamma correction to images of a first stream of images obtained of user 215. The first stream of images can be collected over a predetermined period of time. Further, the first camera can configured to perform uniform auto correction when capturing images of the user 215 in the context of identity authentication when performing an operation or transaction. The uniform auto correction can be substantially similar to the described correction for the first camera 120 related to white balancing, auto gain, and auto exposure. The second camera 250 does not apply gamma correction and can be configured to apply uniform auto correction to improve the overall brightness, color, and exposure when capturing the image.

The computer system 210 includes a display 260 that provides user interface (e.g., graphical user interface (GUI)) to present data to the user 215 and to provide instructions related to the identity verification process. Further modules or peripheral devices can be connected to the computer system 210 to support voice recognition, gesture navigation, and other.

In some instances, the computer system 210 includes a processor 230. The processor 230 can be configured to obtain streams of images from the two cameras 240 and 250, where the two streams are obtained simultaneously and for performing identity verification for the user 215. The two streams can be obtained for a predetermined period of time that can be configured at the processor. For example, the computer system 210 can be configured to perform identity authentication based on image capturing performed for a set time period of 15 seconds. During the time period, at least a threshold number of captured images can be obtained by each camera, where the cameras are configured to identify face events for capturing the face of the user 215 that can serve for performing biometric matching with an authentication photo from a verified source as discussed above.

In some instances, the processor 230 can be configured to obtain a first stream of images of the user 215 that are with applied gamma correction over the signal obtained by the camera 240. The processor 230 can be configured to obtain a second stream of images of the user 215 that is without applying gamma correction. The second stream of images can be obtained by applying uniform auto correction for the obtained images including automatic white balancing, automatic gain, and automatic exposure.

In some instances, the processor 230 can be configured to execute implemented logic for performing verification of the identity of the user by using the first stream and the second stream of images for independent automated matching with the authentication image of the user. In some other instances, the process can be configured to provide the obtained first and second stream to a communicatively coupled system or component for performing the identity verification. In some instances, the communicatively coupled system or component can be running on the computer system 210 or externally, for example, accessible over a network, or running as a cloud service, among other examples.

Figure 3:
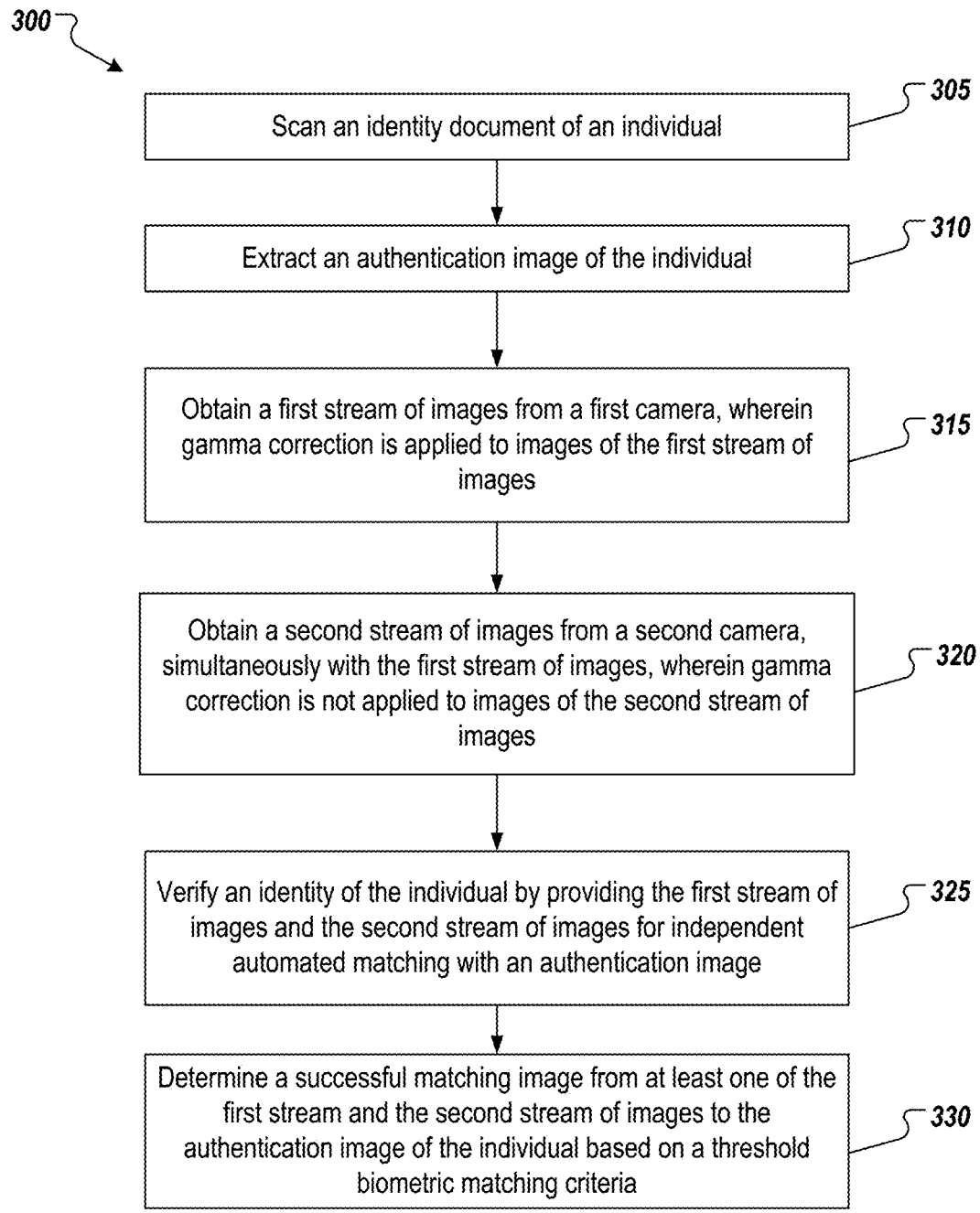
FIG. 3 is a flow chart showing an example method for identity verification in accordance with implementations of the present disclosure.

FIG. 3 is a flow chart showing an example method 300 for identity verification in accordance with implementations of the present disclosure.

The example method 300 can be implemented, in some examples, at the environment 200 of FIG. 2 or the environment 400 of FIG. 4 (discussed below). The example method 300 can be implemented at a biometric authentication system that provides services for secure management of credentials for authorization of requested at the biometric authentication system by a user (e.g., an individual requesting identity verification based on facial image matching).

In some implementations, the method 300 can be executed in the context of performing identity verification of an individual. In some instances, the processor 230 of FIG. 2 can be configured to execute operations of the example method 300 and further operations as discussed in relation to FIG. 1A, 2, and below.

In some instances, a user may request to execute an operation or a transaction at a computer system or application, where the operation or the transaction required identity verification. In some instances, such identity verification can be performed by a biometric authentication system that implements the example method 300. The execution of the operation or transaction may be associated with authentication requirements and identity authentication criteria.

At 305, an identity document of the individual is scanned. The individual can provide the identity document for scanning at a scanner that can be part of the biometric authentication system or can be communicatively coupled to the biometric authentication system. The identity document can be a passport, an identity car, or other verified source that can present or refer to an authentication image that would be used for matching with live images obtained from the individual whose identity is verified.

At 310, the authentication image can be extracted. The extraction can be performed from either the scanned image or from a referenced document associated with the scanned identity document that includes an authentication image. For example, the scanned identity document can be associated with a network accessible storage including the authentication image of the identity document. In some instances, the authentication image can be a face image of the individual, where the face can be captured to include facial features that can be used for biometric matching with other live images of the individual.

At 315, a first camera obtains a first stream of images of an individual. The first camera applies gamma correction to images of the first stream of images. The gamma corrections are applied to adjust image conditions for darker images, for example, as discussed for FIG. 2 and first camera 120.

In some instances, after the gamma correction is applied to images of the first stream, the images of the first stream of images can be processed by adjusting characteristics of the images of the first stream to enhance one or more of color, brightness, and saturation of the images of the first stream of images.

In some instances, the gamma correction can be performed on an input signal received from the first camera when capturing images of the face of the individual to adjust the captured image of the face by brightening regions of the image that are darker to reproduce fine differences in shade within the image to differentiate between reproduced features of the face of the individual.

In some instances, subsequently to applying the gamma corrections, automatic enhancements of characteristics of the gamma-corrected images can applied to obtain the first stream of images. The automatic enhancements can include automated white balancing corrections, automated gain, and automated exposure.

At 320, a second camera obtains a second stream of images of the individual simultaneously with the first stream of images. The gamma correction is not applied to images of the second stream of images.

In some instances, the first and the second camera that obtain streams of images at 315 and 320 may be similar to the first and second camera described at FIGS. 1A and 2. In some instances, adjusting the characteristics of the images of either the first stream or the second stream can include performing automatic white balance corrections on captured images of the individual. In some instances, the images of the second stream of images can be processed by adjusting characteristics of the images to enhance one or more of color, brightness, and saturation of the images of the second stream. In some instances, the images obtained by the first camera and/or the second camera can be have a dynamic range adjusted to a wider gray level range to capture images that are clearer.

In some instances, obtaining images by the first camera and the second camera can be performed by automatically determining a correct exposure of the individual that is captured at the images.

At 325, an identity of the individual is verified by providing the first stream of images and the second stream of images for independent automated matching with an authentication image. The authentication image is an image of the individual from a verified source. In some instances, the images of the first subset of images and of the second subset of images that are provided for the verification may be images that meet a quality criteria for use of the images in identity authentication of the individual based on facial recognition. The authentication images can be an image from an identity card or a passport that is obtained by scanning the passport, for example, at a scanner part of (or coupled to) the biometric authentication system.

In some instances, the images of the first stream and the second stream can be ranked according to a quality criteria. The quality criteria can include rules associated with color quality characteristics of the images and facial features requirements. The images from the two separate stream can be provided in an ordered form based on the ranking for performing independent matching for the identity verification.

In some instances, the authentication image of the individual can be provided for independent biometric matching with images from the two streams. The biometric matching can be based on face features matching between face features extracted from at least a portion of the images of the first stream of images and/or at least a portion of the images of the second stream of images and face features extracted from the authentication image.

At 330, a successful matching image is determined, where the successful matching image is an image from at least one of the first stream and the second stream of images to the authentication image of the individual based on a threshold biometric matching criteria.

Figure 4:
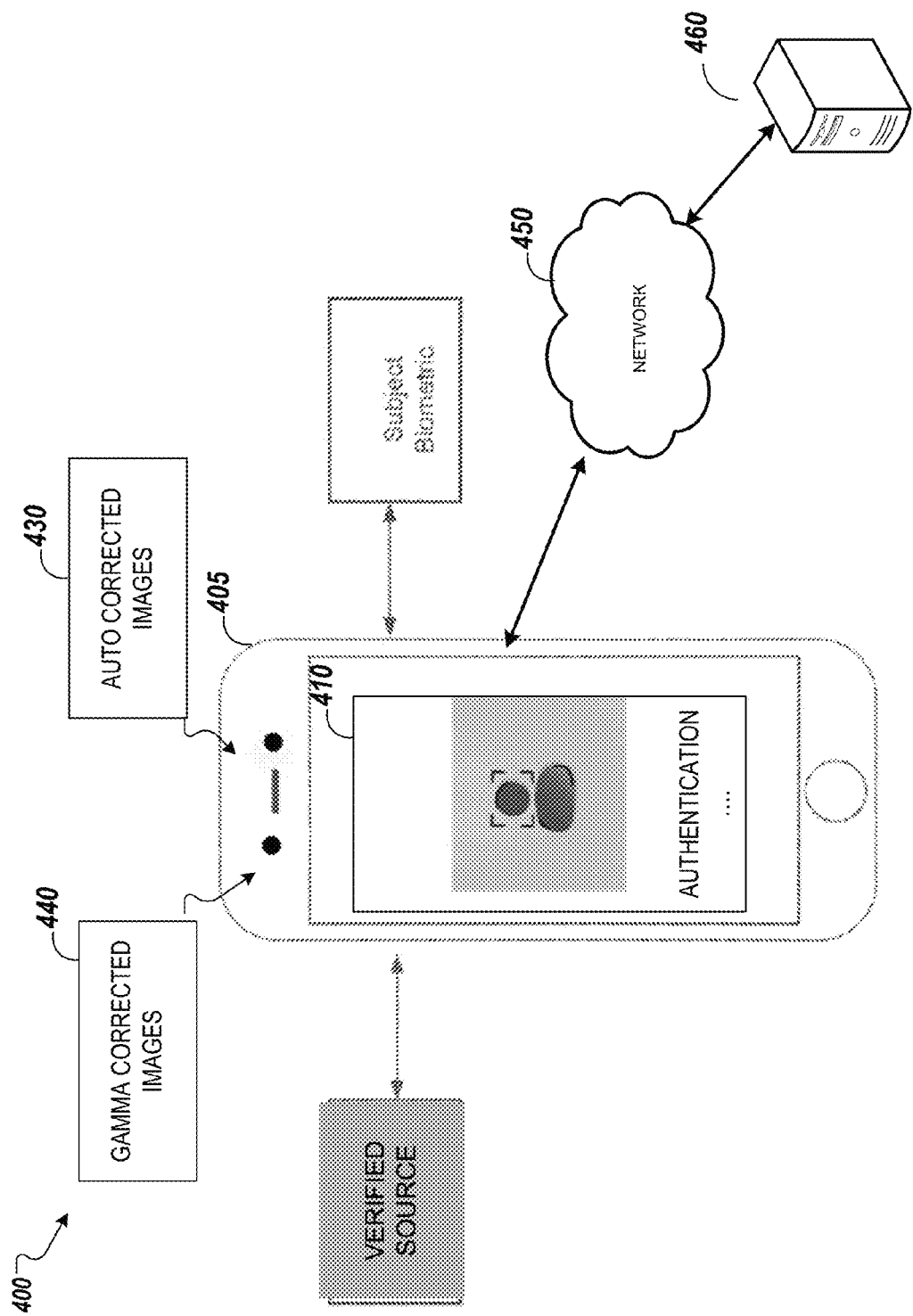
FIG. 4 is a block diagram of an example system for performing identity verification on a mobile device in accordance with implementations of the present disclosure.

FIG. 4 is a block diagram of an environment 400 for performing identity authentication on a mobile device 405 in accordance with implementations of the present disclosure. In some instances, an individual can perform identity verification through the mobile device 405 by performing image capturing of the face of the individual and providing a verified source of his identity. In some instances, the verified source can be a passport, and the verified source can be scanned by the mobile device with a camera of the mobile device. The mobile device 405 includes at least two cameras, where at least two cameras are on one side of the device and can be configured to obtain simultaneously images of the individual to be used for image matching, for example, as described in FIGS. 1A, 2, and 3. The mobile device 405 may be provided with a third camera that can be used for scanning the verified source, or one of the two cameras used for obtaining images of the individual can be used to scan the verified source.

In some instances, the mobile device can be configured to obtain images of an individual from two cameras, substantially similar to the performed obtaining of images discussed at FIG. 1A (cameras 120 and 130), FIG. 2 (camera 240 and 250), and FIG. 3. The mobile device can include a first camera that obtains gamma corrected images 440 and a second camera that obtains images 430 that are not gamma corrected images. In some instances, the second images 430 can be auto corrected images (e.g., the second camera can apply automatic corrections including auto gain, auto white balance, and auto exposure).

In some instances, the cameras obtain images of the face of the individual to perform biometric authentication based on facial recognition.

The mobile device 405 includes a display showing user interface 410 where instructions related to the identity authentication can be provided. Further, the user interface 410 can present images currently obtained by either one or both of the cameras during the identity verification process.

In some instances, an individual can use the mobile device 405 to perform facial recognition that is compared with an authentication image extracted from a provided verified source.

In some instances, the mobile device 405 is configured to verify the identity of the individual by providing the two streams of images-gamma corrected images 440 and the auto corrected images 430—for independent matching with the authentication image of the individual. The verification can be executed at the mobile device 405, or can be executed at an authentication system 460 that can be communicatively coupled to the mobile device 405. The authentication system 460 can be configured to perform operations as described in example method 300 of FIG. 3. The authentication system 460 can obtain the two streams of images from the two cameras of the mobile device. The authentication system 460 can determine whether the individual can be successfully authenticated by comparing independently images from both streams until a best match image is determined. For example, the authentication system 460 can be deployed as an on-premise system. In another example, the authentication system 460 can be provided as a cloud system providing identity verification as a cloud service.

The authentication system 460 together with the mobile device 405 can perform substantially similar operations as previously described at FIGS. 1A, 2, and 3, where the interaction with the user is performed through a mobile device, such as a mobile phone, handheld device, personal assistant, tablet, augmented reality device, console, among other example mobile devices.

Figure 5:
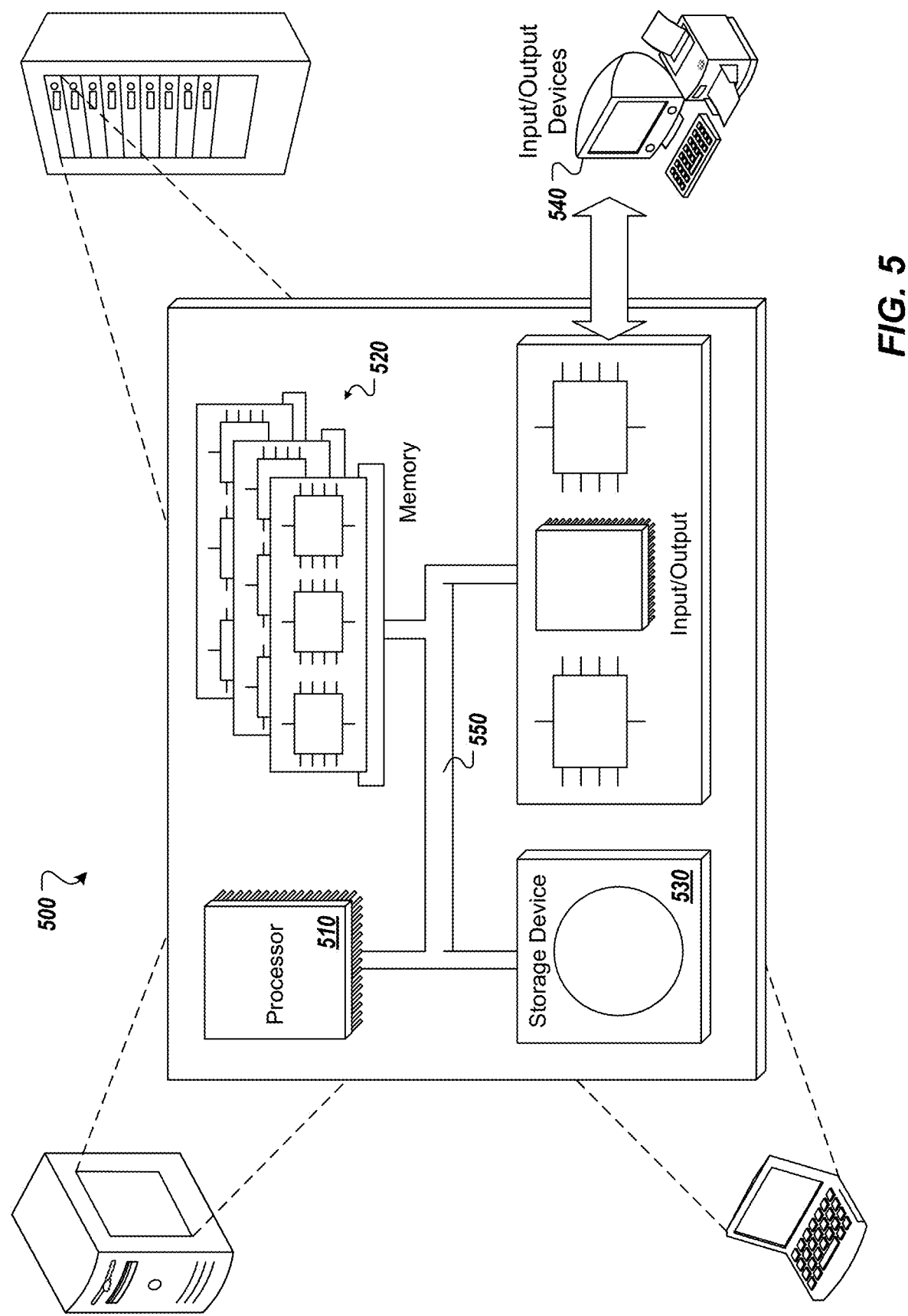
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed:

1. A computer implemented method executed by one or more processors of a biometric authentication system, the method comprising:
   obtaining, from a first camera, a first stream of images of an individual, wherein gamma correction is applied to images of the first stream of images;
   obtaining, from a second camera, a second stream of images of the individual simultaneously with the first stream of images, wherein gamma correction is not applied to images of the second stream of images; and
   verifying an identity of the individual by iteratively providing a verification image selected from the first stream of images or the second stream of images to a communicatively coupled system for independent automated matching with an authentication image, wherein the authentication image is an image of the individual from a verified source.

2. The method of claim 1, wherein the gamma corrections are applied to adjust image conditions for darker images, wherein the method further comprises:
after the gamma correction is applied, processing the images of the first stream of images by adjusting characteristics of the images of the first stream to enhance one or more of color, brightness, and saturation of the images of the first stream of images; and
processing the images of the second stream of images by adjusting characteristics of the images of the second stream of images to enhance one or more of color, brightness, and saturation of the images of the second stream.

3. The method of claim 2, wherein adjusting the characteristics of the images of either the first stream or the second stream comprises performing automatic white balance corrections on captured images of the individual.

4. The method of claim 1, wherein obtaining images by the first camera and/or the second camera comprises automatically adjusting a dynamic range of captured images to a wider gray level range.

5. The method of claim 1, wherein obtaining images by the first camera and the second camera is performed by automatically determining a correct exposure of the individual that is captured at the images.

6. The method of claim 1, wherein the first stream of images and the second stream of images are obtained during a predetermined period of time; and
wherein the verifying further comprises determining a best match between the first stream of images and the second stream of images and the authentication image, where the best match is determined according to an amount of common facial characteristics between the verification image and the authentication image.

7. The method of claim 1, wherein verifying an identity of the individual by providing the first stream of images and the second stream of images for independent automated matching with an authentication image comprises providing a first subset of images from the first stream and a second subset of images from the second stream for independent automated matching, and wherein images of the first subset of images and of the second subset of images meet a quality criteria for use of the images in identity authentication of the individual based on facial recognition.

8. The method of claim 7, further comprising ranking the images of the first stream and the second stream according to the quality criteria, and wherein the quality criteria comprise rules associated with color quality characteristics of the images and facial features requirements.

9. The method of claim 1, the gamma correction is performed on an input signal received from the first camera when capturing images of a face of the individual to adjust at least one captured image of the face by brightening regions of the image that are darker to reproduce fine differences in shade within the image to differentiate between reproduced features of the face of the individual.

10. The method of claim 1, wherein obtaining the first stream of images comprises:
applying the gamma correction when capturing images of the individual at the first camera; and
subsequently applying automatic enhancements of characteristics of the captured images to obtain the first stream of images, wherein the automatic enhancements include automated white balancing corrections, automated gain, and automated exposure.

11. The method of claim 1, further comprising:
scanning an identity document as the verified source of the authentication image of the individual;
in response to processing the identity document, extracting the authentication image of the individual from the identity document; and
providing the authentication image of the individual for independent biometric matching of the authentication image with images from the first stream and second stream of images.

12. The method of claim 1, further comprising:
determining a successful matching image from at least one of the first stream and the second stream of images to the authentication image of the individual, wherein the successful matching image is determined based on a threshold biometric matching criteria for authenticating the individual.

13. The method of claim 1, wherein the verification of the identity of the individual is based on face features matching between face features extracted from at least a portion of the images of the first stream of images and/or at least a portion of the images of the second stream of images and face features extracted from the authentication image.

14. The method of claim 1, wherein the first camera and the second camera are part of a mobile device, and wherein the first stream of images and the second stream of images are used for performing face recognition of the individual to provide access to requested resources at the mobile device.

15. A biometric authentication system comprising:
a first camera configured to capture a first stream of images of an individual and apply gamma correction to images in the first stream of images;
a second camera configured to capture a second stream of images of the individual without applying gamma correction to images in the second stream of images;
at least one processor in communication with the first camera and the second camera; and
a data store coupled to the at least one processor having instructions stored thereon which, when executed by the at least one processor, causes the at least one processor to perform operations comprising:
obtaining the first stream of images of the individual from the first camera;
obtaining the second stream of images of the individual from the second camera simultaneously with the first stream of images;
verifying an identity of the individual by providing the first stream of images and the second stream of images to a communicatively coupled system for independent automated matching with an authentication image, wherein the authentication image is an image of the individual from a verified source; and
wherein the verifying further comprises determining a best match between the first stream of images and the second stream of images and the authentication image, where the best match is determined according to an amount of common facial characteristics between the verification image and the authentication image.

16. The system of claim 15, wherein the gamma corrections are applied to adjust image conditions for darker images, wherein the data store further stores instructions, which when executed by the at least one processor, cause the at least one processor to perform operations comprising:

after the gamma correction is applied, processing the images of the first stream of images by adjusting characteristics of the images of the first stream to enhance one or more of color, brightness, and saturation of the images of the first stream of images; and processing the images of the second stream of images by adjusting characteristics of the images of the second stream of images to enhance one or more of color, brightness, and saturation of the images of the second stream.

17. The system of claim 15, wherein the first camera is configured to obtained images of the individual for a first predetermined time period to obtain the first stream of images, and wherein the second camera is configured to obtained images of the individual for a second predetermined time period to obtain the second stream of images.

18. A non-transitory computer-readable storage medium coupled to at least one processor and having instructions stored thereon which, when executed by the at least one processor, cause the at least one processors to perform operations for supporting maintenance procedures in database systems, the operations comprising:

obtaining, from a first camera, a first stream of images of an individual, wherein gamma correction is applied to images of the first stream of images;

obtaining, from a second camera, a second stream of images of the individual simultaneously with the first stream of images, wherein gamma correction is not applied to images of the second stream of images;

verifying an identity of the individual by providing the first stream of images and the second stream of images for independent automated matching to a communicatively coupled system with an authentication image, wherein the authentication image is an image of the individual from a verified source; and wherein the verifying further comprises determining a best match between the first stream of images and the second stream of images and the authentication image, where the best match is determined according to an amount of common facial characteristics between the verification image and the authentication image.

19. The computer-readable storage medium of claim 18, wherein the gamma corrections are applied to adjust image conditions for darker images, wherein the computer-readable storage medium further stores instructions, which when executed by the at least one processor, cause the at least one processor to perform operations comprising:

after the gamma correction is applied, processing the images of the first stream of images by adjusting characteristics of the images of the first stream to enhance one or more of color, brightness, and saturation of the images of the first stream of images; and processing the images of the second stream of images by adjusting characteristics of the images of the second stream of images to enhance one or more of color, brightness, and saturation of the images of the second stream.

20. The computer-readable storage medium of claim 18, wherein the computer-readable storage medium further stores instructions, which when executed by the at least one processor, cause the at least one processor to perform operations comprising:

determining a successful matching image from at least one of the first stream and the second stream of images to the authentication image of the individual, wherein the successful matching image is determined based on a threshold biometric matching criteria for authenticating the individual.

\* \* \* \* \*